UNITED STATES PATENT OFFICE.

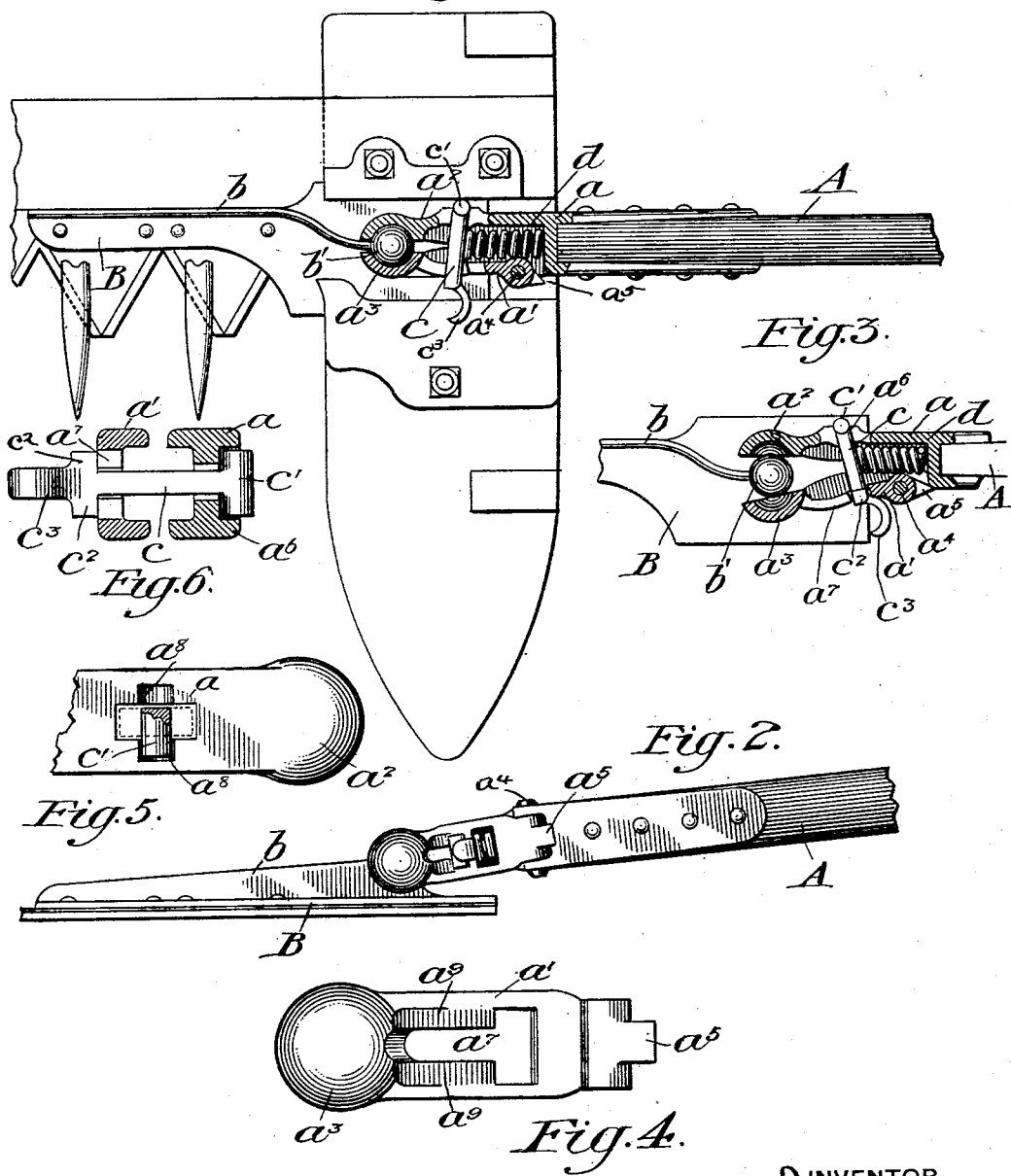

EDWARD A. JOHNSTON, OF CHICAGO, ILLINOIS.

PITMAN CONNECTION.

SPECIFICATION forming part of Letters Patent No. 684,435, dated October 15, 1901.

Application filed December 22, 1900. Serial No. 40,750. (No model.)

*To all whom it may concern:*

Be it known that I, EDWARD A. JOHNSTON, a citizen of the United States, residing at Chicago, county of Cook, and State of Illinois, have invented certain new and useful Improvements in Pitman Connections; and I do hereby declare the following to be a full, clear, and exact description of the invention, such as will enable others skilled in the art to which it appertains to make and use the same.

My invention relates to improvements in pitman connections, and pertains more particularly to joints for use in connection with the knife-heads of mowing-machines, although it is equally well adapted for use in various other relations where a flexible connection between moving parts is desired.

The object of my invention is to provide a ball-and-socket connection between the pitman and the reciprocating part wherein the pivoted spoons are held in close and adjustable engagement with the ball by means of a spring-actuated link pivoted to one spoon and engaging a cam on the other spoon, whereby a simple, durable, and effective joint is secured.

My invention is illustrated in the accompanying drawings, in which—

Figure 1 is a plan view of my improved pitman connection as applied to the knife-head of a mowing-machine. Fig. 2 is a side elevation of the same. Fig. 3 is a plan view showing the connection in a position to be locked to the coöperating ball on the knife-head. Fig. 4 is an enlarged detail view of the pivoted spoon. Fig. 5 is a corresponding view of the fixed spoon, showing the manner of mounting the locking-link; and Fig. 6 is an enlarged detail view illustrating the coöperating engagement of the link and the respective spoons.

Heretofore it has been customary to secure a ball-and-socket connection between the pitman and the knife-head of a mowing-machine by means of a bolt passing through the spoons, which were brought to bear upon the ball by means of a nut or cam-lever on the bolt. The objection to this securing means lies in the fact that the bearing could not be adjusted at all, or, if adjustable, a careless or ignorant operator would make the bearing between the ball and the spoons either too tight or too loose. The danger of breakage in a tight connection is manifest, and if the connection be too loose the engaging parts will soon pound to pieces under the rapid heavy shocks incident to machines of this type. The value of the ball-and-socket connection at the knife-head is dependent upon the connection being kept at just the right degree of tightness, and it is characteristic of my invention that this and other desirable features are attained by a spring-actuated locking-link carried by one spoon and having a sliding adjustment with a cam on the other link, whereby all wear between the ball and the spoons is automatically compensated for.

Referring to the drawings, A represents the pitman-rod of a mowing-machine, to which is rigidly attached a spoon $a$ by means of bolts passing through suitable straps formed with said spoon and lying on either side of the pitman. Beyond these straps the spoon $a$ is provided with side walls, to which is pivoted, by means of pintle $a^4$, the coöperating spoon $a'$, which is adapted to swing toward and from the fixed spoon, as indicated in Fig. 3, and which is limited in its outward movement by a suitable lug or detent $a^5$, which strikes against a shoulder on the fixed spoon. The fixed spoon has a longitudinal slot $a^6$, which is flanked by two recesses $a^8$ to form a bearing for the journal $c'$ of a link $c$, which passes through said slot. The pivoted spoon has a T-shaped slot $a^7$, through which works the shank of the link $c$, so that the shoulders $c^2$ of said link will ride upon the cams $a^9$, lying on the respective sides of the slot $a^7$. The pitch of these cams is such that as the shoulders $c^2$ of the link $c$ ride up the surface thereof the two spoons will be drawn together, so that the socket ends $a^2$ and $a^3$ thereof will embrace the ball-bearing $b'$, which is attached by a suitable bracket $b$ to the cutter-head B.

In order to provide an automatic adjustment of the spoons, I arrange a strong spiral spring $d$, which is seated in the recess formed by the side walls of spoon $a$ and bears against the shank of link $c$, thereby tending to force the link into engagement with the cams $a^9$. The pressure of this spring is constant and serves to keep the sockets $a^2$ $a^3$ of the spoons in operative engagement with the ball-bearing $b'$. The pitch of the cam is such that however hard the shock of the pitman against the knife-head the link will not slide back on the cam and loosen the spoons on the ball-bearing.

In assembling the parts link $c$ is turned sidewise and dropped through slot $a^6$ and then turned so that the journal $c'$ engages the bearings $a^8$. The lower end of the link is then passed through the T-head of slot $a^7$ in spoon $a'$, thereby compressing the spring $d$, which has been previously seated in the recess. In this position the jaws of the spoons, which are distended, are brought over the ball-bearing $b'$, when the pivoted spoon is swung on its pivot, and spring $d$ forces the link forward, causing the shoulders $c^2$ to engage and ride up the cams $a^9$. The sockets $a^2$ and $a^3$ hug the ball-bearing $b'$ with just sufficient force to insure an easy-working bearing, and any subsequent wear between the parts will be immediately taken up by the spring $d$, forcing the link farther up the cams.

In order to remove the knife-head, the operator grasps the handle $c^3$ and swings the link backward until the shoulders $c^2$ lie in the T-head of slot $a^7$. Spoon $a'$ then drops away from the ball-bearing $b'$, and the knife-head may be disengaged. When the parts are to be assembled and the bearing $b'$ is in position, it is only necessary to press the spoons together, when the spring automatically locks and adjusts the connection.

Having thus described my invention, what I claim is—

1. A pitman connection comprising a pair of coöperating spoons, means carried by the shank of one spoon, to lock said spoons in operative position, and a spring acting directly on said means to force said locking means into engagement with the other spoon.

2. A pitman connection comprising a pair of coöperating spoons, a link carried by the shank of one spoon to lock said spoons in operative position, and a spring located in a recess of one of said spoons and acting directly on said link to force said link into locking engagement with the movable spoon.

3. A pitman connection, comprising coöperating spoons, a spring-actuated link pivoted to one of said spoons, and a cam on the other of said spoons engaged by the link.

4. A pitman connection, comprising a fixed spoon, a coöperating spoon pivoted thereto, a link carried by one of said spoons, a cam on the other of said spoons, and a spring carried by the fixed spoon to force said link into locking engagement with the cam.

In testimony whereof I affix my signature in presence of two witnesses.

EDWARD A. JOHNSTON.

Witnesses:
B. R. BENJAMIN,
WILLIAM WEBBER.